United States Patent [19]

Muramatsu

[11] Patent Number: 5,455,920
[45] Date of Patent: Oct. 3, 1995

[54] MULTIPROCESSOR SYSTEM HAVING OFFSET ADDRESS SETTING

[75] Inventor: Kikuo Muramatsu, Itami, Japan

[73] Assignee: Mitsubishi Denki Kabushiki Kaisha, Tokyo, Japan

[21] Appl. No.: 163,403

[22] Filed: Dec. 7, 1993

Related U.S. Application Data

[63] Continuation of Ser. No. 543,242, Jun. 25, 1990, abandoned.

[30] Foreign Application Priority Data

Dec. 4, 1989 [JP] Japan .................................. 1-316007

[51] Int. Cl.⁶ ............................. G06F 9/26; G06F 12/00
[52] U.S. Cl. .............. 395/200.08; 395/375; 395/421.07; 395/476; 395/419; 364/244.8; 364/228; 364/245.31; 364/255.1; 364/258.1; 364/259; 364/DIG. 1
[58] Field of Search .................... 395/400, 425, 395/375

[56] References Cited

U.S. PATENT DOCUMENTS 4,121,283  10/1978  Walker ..................................... 395/275
4,796,232  1/1989  House ..................................... 365/189
4,999,768  3/1991  Hirokawa ................................ 395/275
5,327,541  7/1994  Reinecke et al. ....................... 395/400

OTHER PUBLICATIONS

"Serial Multiprocessing Architecture for Signal Processing," *IBM Technical Disclosure Bulletin*, vol. 32, No. 3B, Aug. 1989, IBM Corp.

Livingston, et al., "Transparent Hardware Address Offset for Use in a Common Memory, Multi–Processor Environment," *IBM Technical Disclosure Bulletin*, vol. 26, No. 11, Apr. 1984, IBM Corp.

*Primary Examiner*—Kevin J. Teska
*Assistant Examiner*—Ayni Mohamed
*Attorney, Agent, or Firm*—Townsend and Townsend Khourie and Crew

[57] ABSTRACT

A multiprocessor system includes the first microcomputer (1) having the first memory (4); the second microcomputer (9) having the second memory (12), the dual port third memory (14), and an offset register (22); buses (18–20) for connecting the first and second microcomputers; an address setting unit (21) provided in the second microcomputer for composing an address value supplied by the first microcomputer and a value set in the offset register to feed address data to the third memory.

6 Claims, 5 Drawing Sheets

MULTIPROCESSOR SYSTEM HAVING OFFSET ADDRESS SETTING

This is a Continuation of application Ser. No. 07/543,242, filed Jun. 25, 1990, now abandoned.

BACKGROUND OF THE INVENTION

The present invention relates generally to multiprocessor systems in which data is exchanged between the microcomputers and, more particularly, to a multiprocessor system in which a microcomputer with a dual port memory is used.

A multiprocessor system using a conventional dual port memory is shown in FIG. 3. The single-chip microcomputer A1 consists of a central processing unit A (CPUA) 2 for performing various operations and data processing; a read only memory A (ROMA) 3 in which programs are stored; a random access memory A (RAMA) 4 in which data, etc. are stored; an input/output (I/O) port A 5 for exchanging data with external equipment; and internal address, data, and control signal buses A6, A7, and A8 for interconnecting the above units 2–5. Similarly, a single-chip microcomputer B9 consists of a CPUB 10; a ROMB 11; a RAMB 12; an I/O port B13; a dual port RAM (DPRAM) 14 enabling opposite ports to write and read data; and internal address, data, and control signal buses B15, B16, and B17. The microcomputer A1 is connected to the external bus ports of DPRAM 14 via external address, data, and control signal buses 18, 19, and 20 to form a multiprocessor system.

As shown in a memory map of FIG. 4, the memory areas of CPUA 2 and CPUB 10 each consist of addresses "0000" through "FFFF". The addresses of ROMA 3 and ROMB 11, RAMA 4 and RAMB 12, and DPRAM 14 are mapped such that they do not overlap each other.

Data transfer will be described. The data used by the microcomputer A1 is normally loaded in the RAMA 4 and read by the CPUA 2 for processing. When the data is transferred to the microcomputer B9, the CPUA 2 reads the data required by the microcomputer B9 from the RAMA 4 and transfers it to the DPRAM 14 via the external buses 18–19. Then, the CPUB 10 reads the data from the DPRAM 14 and load it in the ROMB 11. When the data is transferred from the microcomputer B9 to the microcomputer A1, the above procedure is reversed. In this way, the DPRAM 14 bridges the two CPUs 2 and 10 for data transfer. If the area where data to be transferred from the microcomputer A1 to B9 (A→B) is placed overlaps the area where data to be transferred from the microcomputer B9 to A1 (B→A), data can be lost unless the procedure of data transfer is well managed. For this reason, the memory area of the DPRAM 14 is divided by the direction of data transfer.

The multiprocessor system is used to separately control various devices such as an engine and a transmission in a vehicle while the respective microcomputers are related to provide sophisticated control. A total control system for an automobile drive train is shown in FIG. 5. This total control system consists of an engine 50; a transmission 60; a microcomputer A1 for controlling the engine; and a microcomputer B9 for controlling the transmission. Data is inputted from an analog sensor 51a and a digital sensor 51b, which are mounted on the engine 50 to sense the number of revolutions and the temperature, to the microcomputer A1 via an A/D converter 52a and a counter 52b to process the characteristic data of the engine, such as the number of revolutions and the temperature, for controlling a fuel injection/ignition control actuator 53 via an I/O port 5. Similarly, data is inputted from an analog sensor 61a and a digital sensor 61b, which are mounted on the transmission 60 to sense the gear position and the torque, to the microcomputer B9 via an A/D converter 61a and a counter 62b to process the characteristic data of the transmission, such as the gear position and the torque, for controlling an oil pressure control actuator 63 via an I/O port 13. In addition, data is transferred between the respective microcomputers 1 and 9 via a DPRAM 14 and an external buses 18–20 to add to the data inputted to each microcomputer 1 or 9 to control the engine 50 and the transmission 60 in a sophisticated manner.

In the conventional multiprocessor system, it is necessary to operate both the CPUs A2 and B10 to transfer data between the microcomputers A1 and B9 with the aid of software. Consequently, an additional load is put on both of the CPUs, and the software is troublesome to process. The presence of the software limits the transfer speed so that the system cannot be used for real time process which requires high process speed. In the automobile control, the larger the amount of data transferred between the two CPUs, the more sophisticated the control. However, the real time process speed of the microcomputers 1 and 9 is so high that there is little time for data transfer between the CPUs, resulting in the small amount of data transferred.

Where a microcomputer B9 is added to control the transmission for enhancing the performance of an automobile which has had a microcomputer A1 to control the engine, it is necessary for performing data transfer to change the memory area of the CPUA 2 so that it corresponds to the memory area of the DPRAM 14. This brings about an overhead problem in software for handling the DPRAM 14. If the program were not changed, it would be not only impossible to transfer data to the microcomputer B9 but also difficult to separate or connect the respective microcomputers.

SUMMARY OF THE INVENTION

Accordingly, it is an object of the invention to provide a multiprocessor system which enables the respective microcomputers to transfer data at high speed, requires no software for data transfer, and/or is easy to separate or connect the respective microcomputers.

According to the invention there is provided a multiprocessor system which includes an offset register in which a given value is able to be set by the second central processing unit of the second microcomputer and an address setting unit for composing the value of the offset register and the address value of an address data bus to supply an address to the dual port third memory.

The above and other objects, features, and advantages of the invention will become more apparent from the following description when taken in conjunction with the accompanying drawings.

DESCRIPTION OF THE PREFERRED EMBODIMENT

Figure 1:
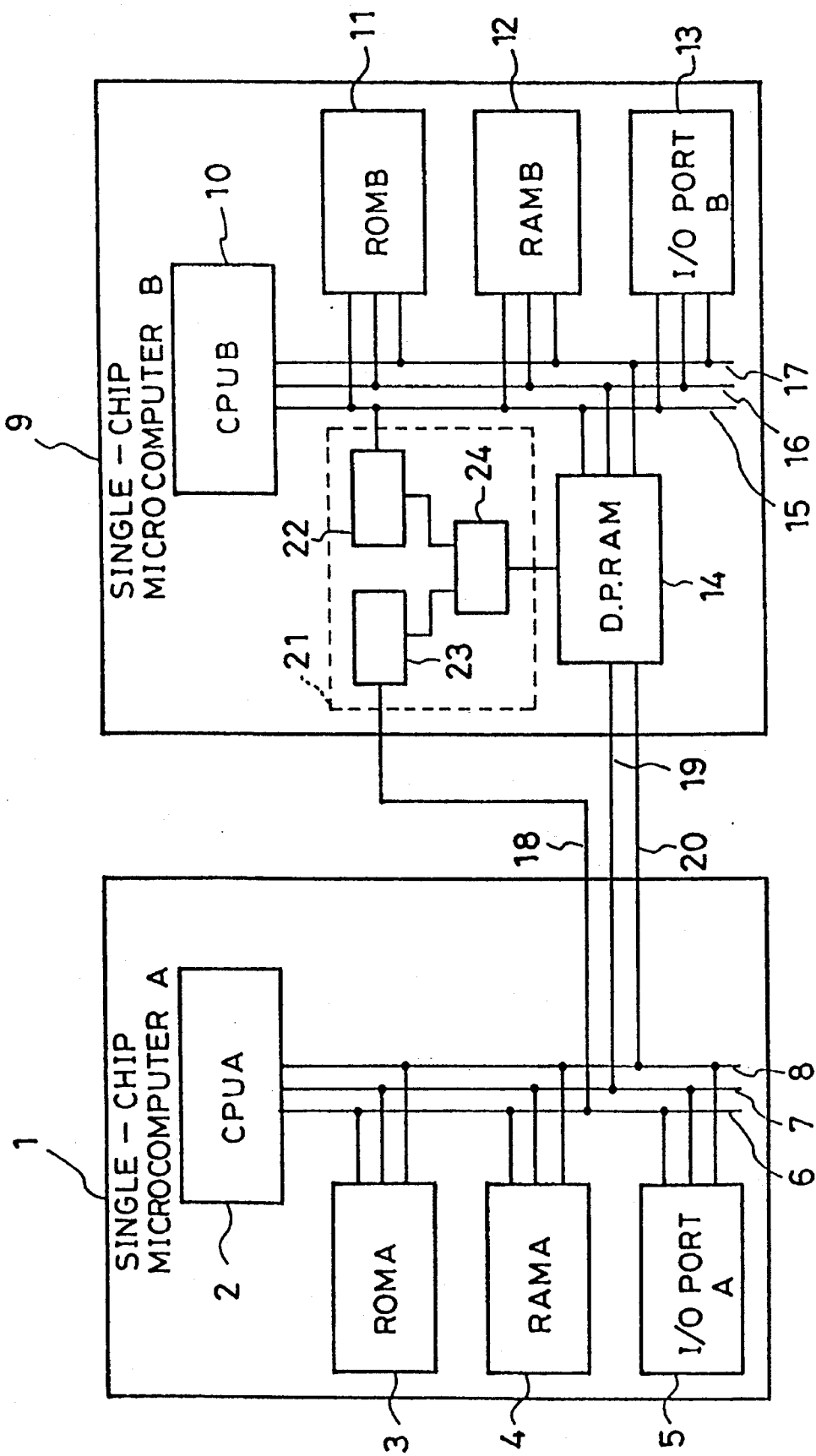
FIG. 1 is a block diagram of a multiprocessor system according to an embodiment of the invention.

In FIG. 1, a single-chip microcomputer A1 consists of a CPUA 2 which performs various operation and data processing; a ROMA 3 in which programs are stored; a RAMA 4 in which data, etc. are loaded; an I/O port A5 for exchanging data with external equipment; and internal address, data, and control signal buses A6, A7, and A8 for interconnecting the respective units 2–5. Similarly, a single-chip microcomputer B9 consists of a CPUB 10; a ROMB 11; a RAMB 12; an I/O B13; a dual port RAM (DPRAM) 14 which enables opposite ports to write and read data; and internal address, data, and control signal buses B15, B16, and B17 for interconnecting the respective units 10–14. The microcomputer B9 also includes an address setting unit 21 for supplying addresses to the DPRAM 14. The address setting unit 21 consists of an offset register 22 in which the CPUB 10 is able to set a given value at a given time; an address latch 23 for latching the address value transferred by the microcomputer A1 via an external address bus 18; and an adder 24 for composing a value of the offset register 22 and an address value of the address latch 23. That is, the adder 24 adds the address latched in the address latch 23 to the value set in the offset register 22 to generate a physical address on the external bus ports of the DPRAM 14. The microcomputer A1 is connected to the external bus ports of the DPRAM 14 via an external data and control signal buses 19 and 20 to form a multiprocessor system.

Figure 2:
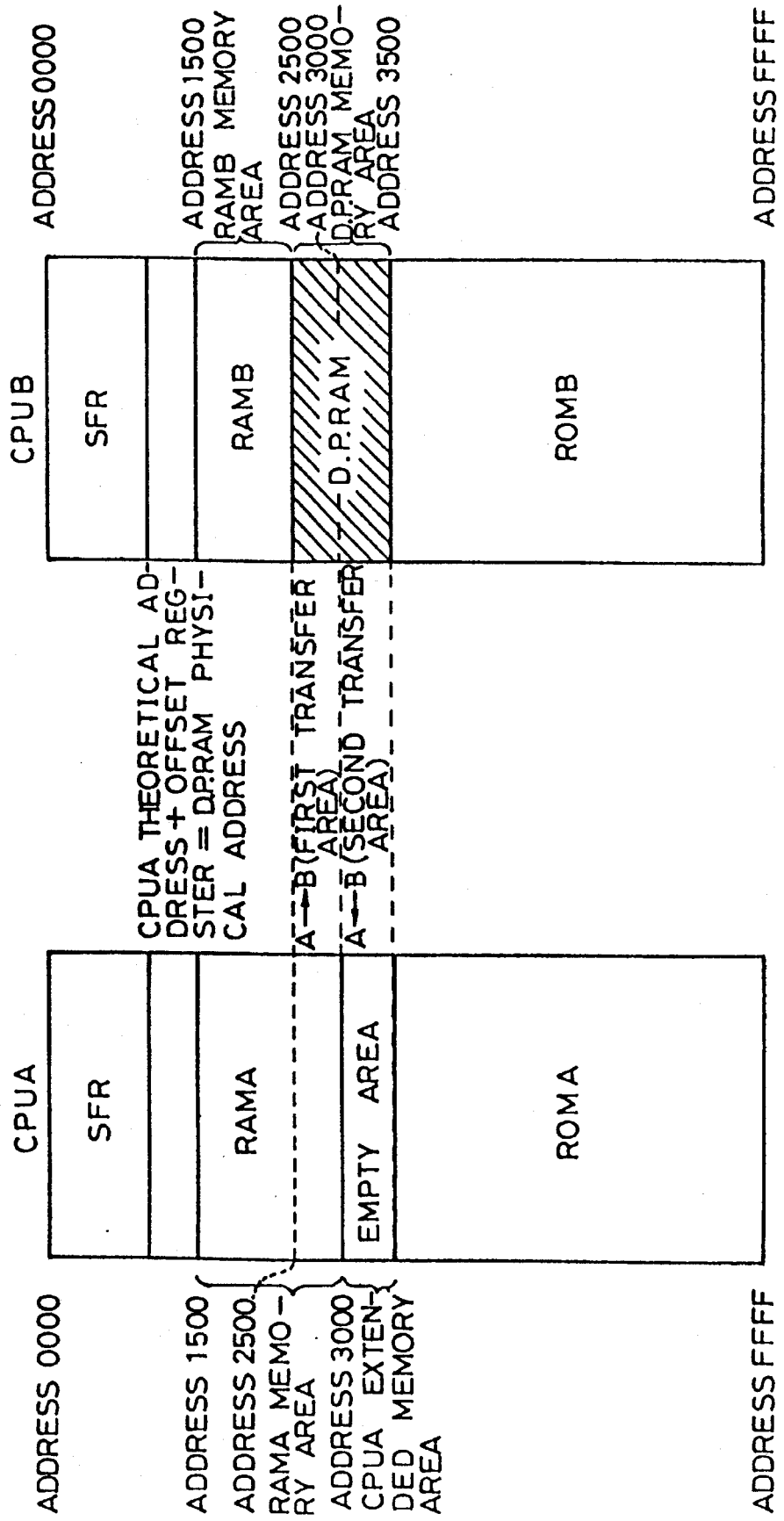
FIG. 2 is a diagram showing a memory map of the multiprocessor system.
Figure 3:
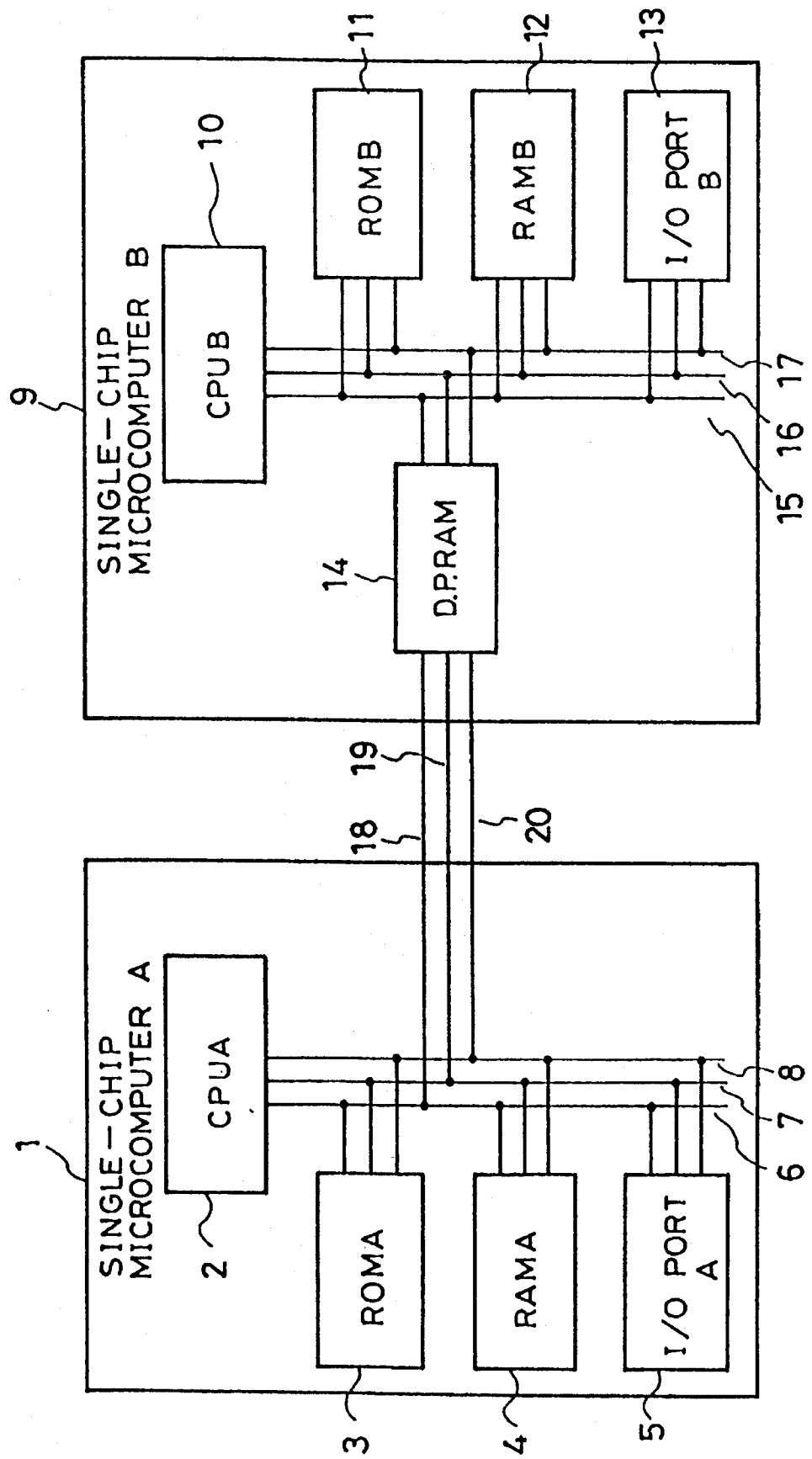
FIG. 3 is a block diagram of a conventional multiprocessor system.
Figure 4:
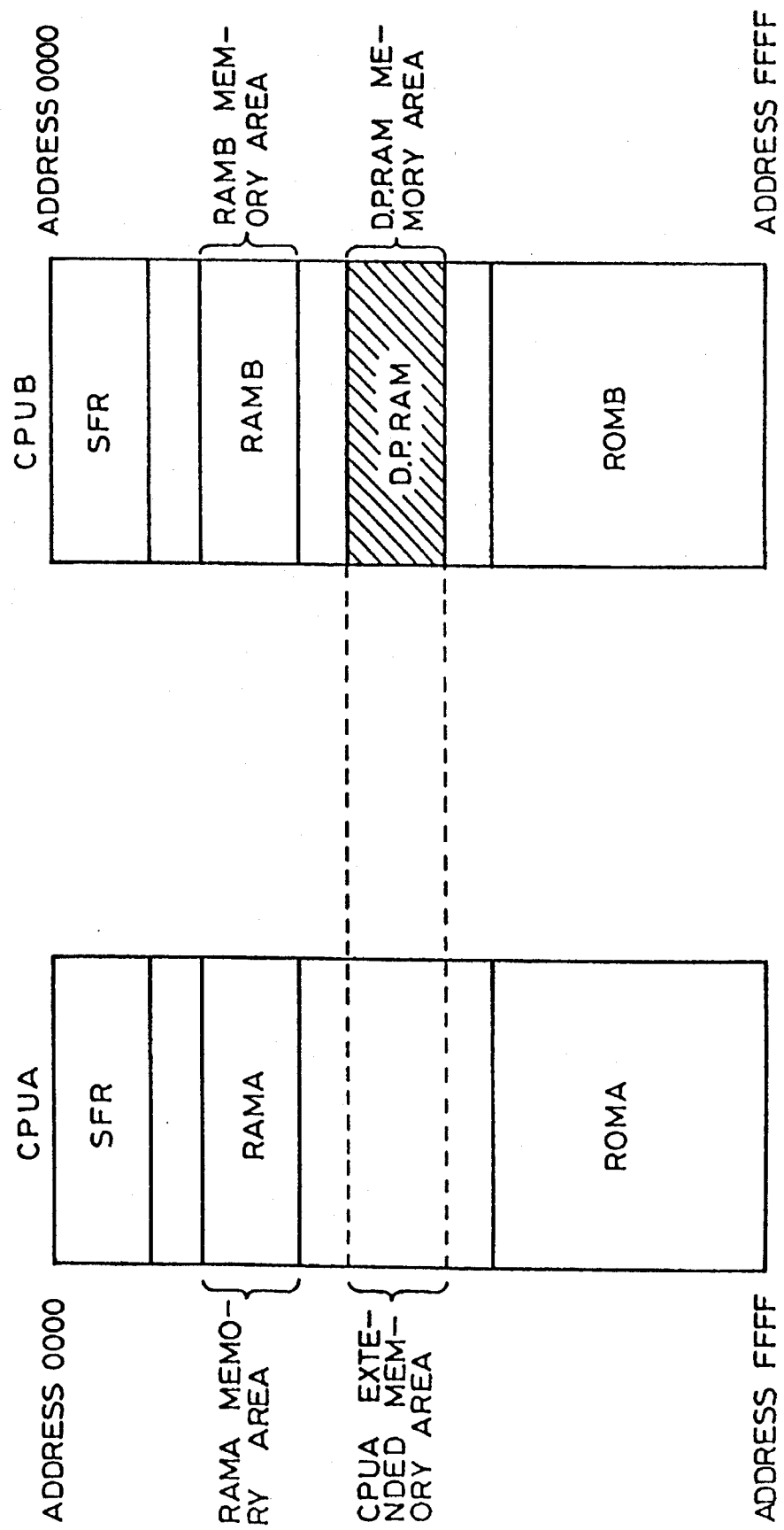
FIG. 4 is a diagram showing a memory map of the conventional multiprocessor system.
Figure 5:
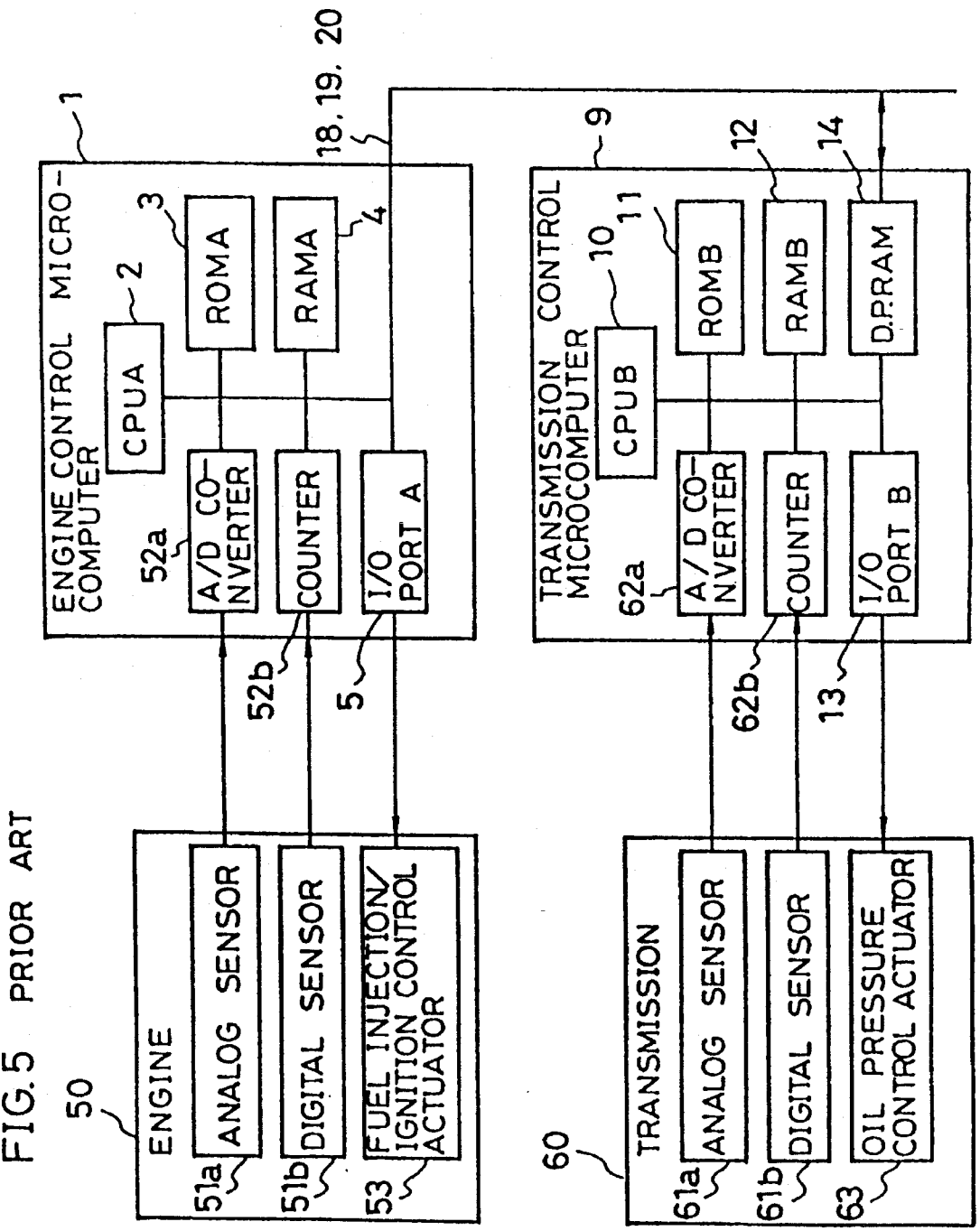
FIG. 5 is a block diagram of an automobile power train total control system.

The operation will be described with reference to FIG. 2, which shows memory maps of the multiprocessor system, which each consist of addresses from "0000" to "FFFF". In the memory area of the CPUA 2, addresses from "1500" to "3000" and "3500" to "FFFF" are assigned to the RAMA 4 and the ROMA 3, respectively. In the memory area of the CPUB 10, addresses from "1500" to "2500," from "2500" to "3500," and from "3500" to "FFFF" are assigned to the RAMB 12, the DPRAM 14, and the ROMB 11, respectively. The area of the DPRAM 14 is divided into the first transfer area α from the microcomputer A1 to B9 (A→B) at addresses from "2500" to "3000" and the second transfer area β from the microcomputer B9 to A2 (B→A) at addresses from "3000" to "3500". The data written by the CPUA 2 at addresses from "2500" to "3000" of the RAMA 4 is transferred to the first transfer area α, while when the CPUB 10 writes data in the second transfer area β of the DPRAM 14, the empty area at addresses from "3000" to "3500" of the CPUA 2, which corresponds to the second transfer area β, is used as an extended area of the RAMA 4. That is, when data is transferred from the CPUA 2 to the CPUB 10, the CPUA 2 outputs an address for accessing the RAMA 4 corresponding to the first transfer area α. This address is latched in the address latch 23 and added to a value of the offset register 22 in the adder 24 to generate a DPRAM physical address. With this address, the first transfer area α of the DPRAM 14 is accessed so that the data identical with the data written in the RAMA 4 is written in the first transfer area α for performing data transfer.

When data is transferred from the CPUB 10 to the CPUA 2, the CPUB 10 writes in the second transfer area β the data necessary for the CPUA 2. When the data necessary for the CPUA 2 is read, an address between "3000" and "3500" corresponding to the second transfer area β is outputted. This address is latched in the address latch 23 and added to a value of the offset register 22 in the adder 24 to generate a DPRAM physical address. With this address, the second transfer area β of the DPRAM 14 is accessed so that the CPUA 2 reads the data from the CPUB 10, thus completing the data transfer.

In this way, it is possible to use the memory area of the DPRAM 14 as a common memory for performing data transfer by setting the memory area of the DPRAM 14 to overlap part of the RAMA 4 area of the CPUA 2 and the address corresponding to the overlapping portion in the offset register 22 by means of the CPUB 10. Since data is transferred by merely using the memory area of the DPRAM 14 as a common memory to write and read data for data transfer, it is possible to achieve high-speed data transfer without using any troublesome software. In addition, since the value of the offset register 22 and the memory area of the DPRAM 14 are able to be set later, it is possible to not only add a microcomputer B9 for controlling the transmission in the automobile power train total control system which has a microcomputer A1 for controlling the engine but also set a given ratio of the first transfer area α to the second transfer area β by adjusting the setting of the offset register 22.

Alternatively, the address composition circuit or adder 24 of the address setting unit 21 may be a logical circuit.

As has been described above, according to the invention, since the address of the third memory is set with an offset register so that data is transferred by merely accessing the third memory, no special software is necessary, the load on the CPU is reduced, and data is transferred between the microcomputers at high speed. In addition, since the offset register can be set at a given value, it is possible to overlap the third memory on the memory area of one of the microcomputers, thereby making it easy to separate or connect the respective microcomputers.

I claim:

1. A multiprocessor system comprising:

a first microcomputer having a first central processor unit (CPU), a first read-only memory (ROM), a first random access memory (RAM), and a first I/O port connected to an internal bus;

a second microcomputer having a second CPU, a second ROM, a second RAM, a second I/O port and a dual port RAM connected to said internal bus;

an external address bus for connecting an internal address bus of said first microcomputer to said second microcomputer;

an external data bus for connecting said dual port RAM to an internal data bus of said first microcomputer; and address setting means, provided within the second microcomputer and coupled to said external address bus, the address setting means comprising:

logical address value holding means for holding a logical address value supplied from said first CPU;

offset value holding means, coupled to the internal address bus of said second microcomputer, for holding an offset value which is set by said second CPU; and address output means for receiving values output from said logical address value holding means and said offset value holding means, calculating a physical address value in said dual port RAM based on these values, and outputting this physical address value to said dual port RAM;

wherein said dual port RAM is divided into a first portion having a first area and a second portion having a second area, said first portion storing data to be transferred from said first RAM at an address specified by said first CPU and said second portion storing data required by the first microcomputer to be written by said second CPU and to be read and transferred to said first microcomputer; and wherein a change in said offset value results in a change in an area ratio between said first and second portions of said dual port RAM.

2. The multiprocessor system according to claim 1, wherein said address output means is an adder.

3. The multiprocessor system according to claim 1, wherein said address output means is a logic circuit.

4. A method for transferring data from a first microcomputer to a second microcomputer, said first microcomputer having a first central processor unit (CPU), a first read-only memory (ROM), a first random access memory (RAM), and a first I/O port connected to an internal bus, and said second microcomputer having a second CPU, a second ROM, a second RAM, a second I/O port and a dual port RAM connected to said internal bus, the method comprising the steps of:

generating, in said second CPU, an offset value, said offset value defining an area ratio of said dual port RAM, by dividing said dual port RAM into a first portion and a second portion;

storing said offset value in an offset value register coupled to an internal address bus of said second microcomputer;

outputting, from said first CPU, an address;

storing said address from said first CPU in an address latch contained in said second microcomputer;

adding said address stored in said address latch with said offset value stored in said offset value register to generate a physical address of said dual port RAM, said physical address located in said first portion of said dual port RAM; and transferring data from said first microcomputer to said second microcomputer through said first potion of said dual port RAM;

wherein a size of said first portion relative to said second portion is modified to accommodate larger transfers of data by changing said area ratio.

5. The method of claim 4, wherein said step of adding is performed by an adder.

6. The method of claim 4, wherein said step of adding is performed by a logic circuit.

* * * * *